US009673592B2

(12) United States Patent
Dittrich et al.

(10) Patent No.: US 9,673,592 B2
(45) Date of Patent: Jun. 6, 2017

(54) X-RAY TUBE

(71) Applicants: Ronald Dittrich, Forchheim (DE); Thomas Ferger, Fürth (DE); Christian Hoffmann, Nürnberg (DE)

(72) Inventors: Ronald Dittrich, Forchheim (DE); Thomas Ferger, Fürth (DE); Christian Hoffmann, Nürnberg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 14/109,292

(22) Filed: Dec. 17, 2013

(65) Prior Publication Data

US 2014/0168832 A1 Jun. 19, 2014

(30) Foreign Application Priority Data

Dec. 18, 2012 (DE) ........................ 10 2012 223 569

(51) Int. Cl.

| | |
|---|---|
| ***H02H 1/00*** | (2006.01) |
| ***H02H 1/04*** | (2006.01) |
| ***H02H 9/06*** | (2006.01) |
| ***H01T 4/08*** | (2006.01) |
| ***H01J 35/02*** | (2006.01) |
| ***H01J 35/04*** | (2006.01) |
| ***H05G 1/54*** | (2006.01) |

(52) U.S. Cl.
CPC .............. *H01T 4/08* (2013.01); *H01J 35/025* (2013.01); *H01J 35/04* (2013.01); *H05G 1/54* (2013.01)

(58) Field of Classification Search
CPC .. H02H 9/06; H01H 33/24; H01T 4/08; H01J 35/04; H01J 35/025; H05G 1/54
USPC .......... 378/127, 136, 138, 200; 361/56, 111, 361/91.1
See application file for complete search history.

(56) References Cited

U.S. PATENT DOCUMENTS

| | | | | |
|---|---|---|---|---|
| 806,333 A | | 12/1905 | Folden | |
| 3,218,422 A | * | 11/1965 | Henry et al. | 218/43 |
| 3,748,521 A | * | 7/1973 | Wright et al. | 313/325 |

(Continued)

FOREIGN PATENT DOCUMENTS

| | | |
|---|---|---|
| CN | 1138742 A | 12/1996 |
| DE | 102012200249 B3 | 10/2012 |

(Continued)

OTHER PUBLICATIONS

German Office Action dated Sep. 17, 2013 for corresponding German Patent Application No. 10 2012 223 569.8 with English translation.

(Continued)

*Primary Examiner* — Thienvu Tran
*Assistant Examiner* — Lucy Thomas
(74) *Attorney, Agent, or Firm* — Lempia Summerfield Katz LLC

(57) ABSTRACT

An x-ray tube includes a vacuum housing. A cathode and an anode are disposed in the vacuum housing and insulated by at least one insulation element. Upon application of a high voltage, the cathode emits electrons that strike the anode as an electron beam. A voltage arrester device with an insulation path has a field strength that is higher than a field strength at the insulation element. If a voltage flashover occurs, the voltage is discharged via the voltage arrester device.

11 Claims, 2 Drawing Sheets

(56) References Cited

U.S. PATENT DOCUMENTS

| | | | | |
|---|---|---|---|---|
| 5,703,924 | A | 12/1997 | Hell et al. | |
| 8,295,440 | B2 | 10/2012 | Cho et al. | |
| 8,761,343 | B2 * | 6/2014 | Jeong | H01J 35/065 378/121 |
| 2002/0028594 | A1 * | 3/2002 | Piemontesi | H01H 31/32 439/181 |
| 2006/0165221 | A1 | 7/2006 | Holm | |
| 2010/0193474 | A1 * | 8/2010 | Rostron et al. | 218/124 |
| 2011/0026681 | A1 * | 2/2011 | Zou | H01J 35/06 378/136 |
| 2013/0177137 | A1 | 7/2013 | Eichhorn et al. | |

FOREIGN PATENT DOCUMENTS

| | | | |
|---|---|---|---|
| JP | H10335093 | A | 12/1998 |
| JP | 2009081108 | A | 4/2009 |
| JP | 2012028133 | A | 2/2012 |
| KR | 1068680 | B1 | 9/2011 |

OTHER PUBLICATIONS

Korean Office action for related Korean Application No. 10-2013-157489, mailed Apr. 13, 2015, with English Translation.

Chinese Office action for related Chinese Application No. 2013106652150, dated Sep. 25, 2015, with English Translation.

Korean Grant Decision for related Korean Application No. 10-2013-0157489, dated Oct. 7, 2015.

* cited by examiner

X-RAY TUBE

RELATED APPLICATIONS

This application claims the benefit of German Patent Application No. DE 102012223569.8, filed Dec. 18, 2012, the entire contents of which are hereby incorporated herein by reference.

TECHNICAL FIELD

The present teachings relate generally to X-ray tubes with vacuum housings.

BACKGROUND

An x-ray tube may include a vacuum housing having at least one cathode and at least one anode disposed therein. The at least one cathode and the at least one anode may be insulated by at least one insulation element. The cathode (e.g., a flat panel emitter, a filament) emits electrons that strike the anode as an electron beam when a high voltage is applied to the cathode.

The electron beam is accelerated towards the anode and strikes the surface of the anode, thereby creating x-ray radiation in the anode material. The x-ray radiation exits as useful x-ray radiation from an x-ray beam exit window in the vacuum housing. The x-ray radiation may be used for imaging processes in the medical or non-medical fields.

With rotating anodes (e.g., rotating anode x-ray tubes or rotating envelope x-ray tubes), compensation may be made for rotation of the anode. The compensation is achieved using deflection electrodes. The electron beam may be focused even in small spaces using deflection electrodes that are arranged close to the cathode (e.g., on the focus head). The deflection electrodes may apply and maintain variable deflection voltages to the cathode voltage. The deflection electrodes may be insulated from the cathode (e.g., insulated from the focus head). The insulation elements may be glass or ceramic passthroughs. The insulation elements may have a reference to the cathode voltage (e.g., HV potential of the cathode).

Because of the space available in the area of the cathode, the size of the insulation elements may be configured for only normal operation although this is not problematic.

A drop in potential that affects the cathode may occur in the event of a technically unavoidable “arcing.” The term “arcing” refers to voltage flashovers and voltage discharges (e.g., exceeding tolerance range of the rated voltage) that occur as transient events (e.g., at random and, therefore, unpredictable times).

Temporally resolved, the potential of at least one of the deflection electrodes and/or the potential of the focus head is reduced by the above-described drop in potential. The deflection electrodes disposed as insulated electrodes briefly remain at full potential. The deflection voltage may also be present at the deflection electrodes.

Since the high-voltage is not generated directly at the cathode, a delay may occur while the focus head and the deflection electrodes adapt to the same potential. During the interim, almost all of the voltage drops across the insulation elements of the deflection electrodes. Further discharges may result shortly after the arcing and may lead to an accelerated destruction of the sensitive insulation elements of the deflection electrodes. Due to the energy-rich discharge, discharge traces on the insulation elements and material deposits on the insulation elements may occur. The material deposits are detrimental to the vacuum in the vacuum housing and, therefore, to operation of the x-ray tube.

SUMMARY AND DESCRIPTION

The scope of the present invention is defined solely by the appended claims, and is not affected to any degree by the statements within this summary.

Other insulated functional parts in the vacuum housing of the x-ray tube in addition to the cathode may be subject to a problem, as described above. These additional parts include, for example, anodes, backscattered electron collectors, and deflection devices.

The present embodiments may obviate one or more of the drawbacks or limitations in the related art. For example, in some embodiments, an x-ray tube including functional parts that are reliably protected against overvoltages over service lifetimes is provided.

An x-ray tube in accordance with the present teachings includes a vacuum housing. At least one cathode and at least one anode are disposed in the vacuum housing. The at least one cathode and at least one anode are insulated by at least one insulation element. On application of high voltage, the cathode emits electrons that strike the anode as an electron beam. In some embodiments, the x-ray tube includes a voltage arrester device with an insulation path that has a higher field strength than the field strength at the insulation element. Thus, when a voltage flashover occurs, a voltage leakage takes place by the voltage arrester device.

The higher field strength of the insulation path of the voltage arrester device as compared to the field strength at the insulation element results in a higher discharge probability at the voltage arrester device. As a result, the insulation element is protected against damage.

The destructive discharge mechanisms of the insulated functional parts in the vacuum housing (e.g. focus head) are reliably prevented. The voltage arrester device provides an “electrical break point” between the respective functional parts and the associated insulation elements. Large differences in potential may lead to destructive discharge mechanisms. The electrical stresses from the insulation elements are taken up by the break point. The break point flashes over or arcs more quickly than the insulation elements.

An x-ray tube in accordance with the present teachings may provide one or more of the following: a voltage arrester device that is highly susceptible to high vacuums over the operating range of the x-ray tube (e.g., 20° C. to 2,000° C. at $10^{-8}$ mbar to $10^{-4}$ mbar); a voltage arrester device that is short-circuit proof under normal operation (e.g., grating lock operation at the focus head, focus voltages of about 6 kV); a voltage arrester device that in the event of arcing is “weaker” in high voltage terms than the insulation elements.

In some embodiments, the voltage arrester device “fires” more quickly than the insulation elements, thereby leading to a lower incidence of wear and degradation in the insulation elements.

In some embodiments, an x-ray tube does not need any insulation elements for effective protection of its functional parts. The functional parts may be configured for potential overvoltages, and may be overly large and overly heavy. In some embodiments of an x-ray tube, volume and weight of the insulation elements increase only insignificantly.

In some embodiments, the voltage arrester device may protect different functional parts arranged insulated in the vacuum housing of the x-ray tube against overvoltages.

In some embodiments, the voltage arrester device may be provided on a focus head of a cathode having at least one deflection electrode, thereby protecting the insulation elements of the cathode against damage from overvoltages.

In some embodiments, the voltage arrester device includes at least one first protection electrode and at least one second protection electrode. The at least one first protection electrode and the at least one second protection electrode are at a predetermined distance from one another. This distance defines the insulation path of the voltage arrester device.

In some embodiments, at least one first protective electrode is arranged on the focus head, and at least one second protective electrode is arranged on at least one deflection electrode. In some embodiments, the focus head forms at least one first protective electrode. Alternatively or in addition, in some embodiments, at least one deflection electrode may form a second protective electrode.

In some embodiments, there is only vacuum in the space between the first protective electrode and the second protective electrode, such that an arc arising in a voltage flashover or during a voltage surge may extinguish itself automatically.

In some embodiments, the voltage arrester device is provided between the cathode and the vacuum housing.

In some embodiments, the voltage arrester device is provided between the anode and the vacuum housing.

In some embodiments, the voltage arrester device may be provided between the cathode and the anode.

In some embodiments, molybdenum may be used as a vacuum-resistant metallic electrode material for the first protective electrode and for the second protective electrode.

Depending on the operating conditions of the x-ray tube and/or the type and the number of the functional parts to be protected, different contours (e.g., symmetrical or non-symmetrical arrangements) may be used for the first protective electrode and the second protective electrode.

In some embodiments, at least one first protective electrode has a spherical contour.

Alternatively or in addition, in some embodiments, at least one second protective electrode has a spherical contour.

In some embodiments, at least one first protective electrode has a plate-shaped contour.

In some embodiments, at least one second protective electrode has a plate-shaped contour.

Since the first protective electrode and the second protective electrode do not have any micro tips, different combinations of electrode shapes may be used depending on the application in order to prevent or greatly reduce arcing. In some embodiments, only small signs of wear and degradation may appear in the insulation elements of the functional parts.

Other contours besides the contours of the two above-described protective electrodes may be used. Examples of other contours are Borda and Rogowski profiles.

The above-described electrode shapes may lead to a weak, inhomogeneous electrical field. In normal operation of the x-ray tube, preliminary discharges of the protective electrodes may be avoided.

DETAILED DESCRIPTION

Figure 1:
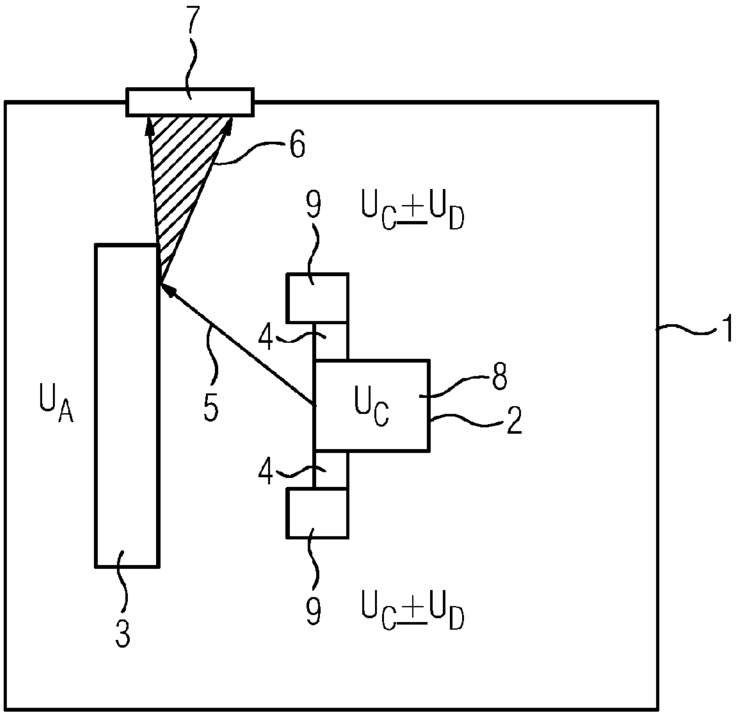
FIG. 1 shows a schematic illustration of an x-ray tube.

FIG. 1 shows a vacuum housing 1. A cathode 2 and an anode 3 are disposed in the vacuum housing 1 and insulated via a number of insulation elements. For simplicity, only two insulation elements 4 are shown for the cathode 2.

Upon application of a cathode voltage $U_C$ (high voltage), the cathode 2 emits electrons that strike the anode 3 as an electron beam 5. An anode voltage $U_A$ is present at the anode 3. The electrons of the electron beam 5 create x-ray radiation 6 at a focal point in the material of the anode 3. The x-ray radiation 6 exits the vacuum housing 1 as useful x-radiation from an x-ray radiation exit window 7.

The cathode 2 includes a focus head 8. A number of deflection electrodes 9 are disposed on the focus head 8 above the insulation elements 4. Once again, for simplicity, only two of the deflection electrodes 9 are shown. A deflection voltage $U_D$ is present at the deflection electrodes. By application of the cathode voltage $U_C$ with a deflection voltage$\pm U_D$, the electron beam 5 may be influenced.

Figure 2:
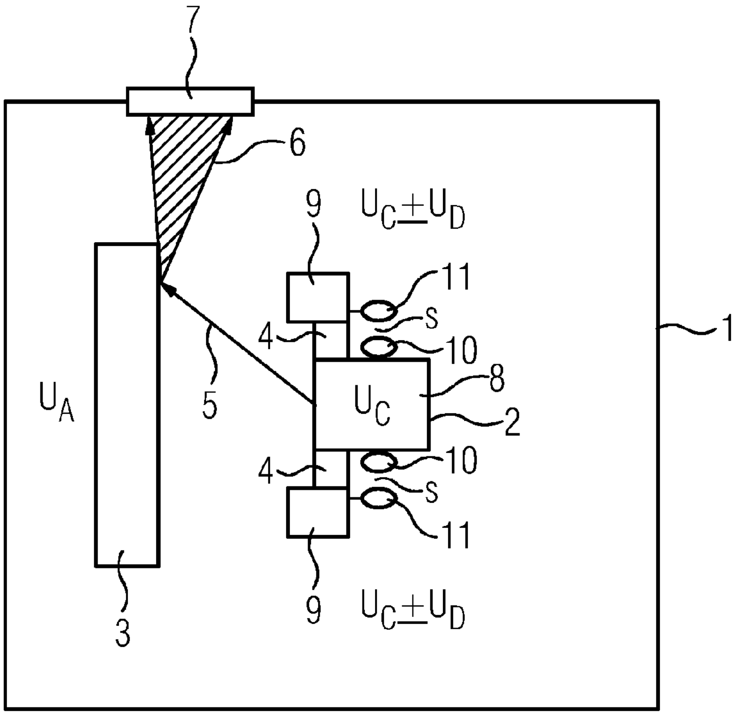
FIG. 2 shows a schematic illustration of an exemplary x-ray tube in accordance with the present teachings.

The x-ray tube shown in FIG. 2 includes a vacuum housing 1. A cathode 2 and an anode 3 are disposed in the vacuum housing 1. The cathode 2 and the anode 3 are each isolated by at least one insulation element. For simplicity, only two insulation elements 4 for the cathode 2 are shown.

Upon application of a cathode voltage $U_C$ (high voltage), the cathode 2 emits electrons that strike the anode 3 as an electron beam 5. An anode voltage $U_A$ is present at the anode 3. The electrons of the electron beam 5 create x-ray radiation 6 at a focal point in the material of the anode 3. The x-ray radiation 6 exits the vacuum housing 1 as useful x-radiation from an x-ray radiation exit window 7.

The cathode 2 includes a focus head 8. A number of deflection electrodes 9 are disposed on the focus head 8 above the insulation elements 4. For simplicity, only two deflection electrodes 9 are shown. A deflection voltage $U_D$ is present at the deflection electrodes. By application of the cathode voltage $U_C$ with a deflection voltage$\pm U_D$, the electron beam 5 may be influenced.

In the event of technically unavoidable voltage flashovers and voltage surges (e.g., exceeding tolerance range of the rated voltage), there is a drop in potential that affects the cathode 2. The transient (e.g., random and, therefore, unpredictable with regard to time) occurrences of voltage flashovers or voltage surges are also referred to as "arcing."

Resolved over time, the above-described drop in potential causes the potential $U_D$ of at least one of the deflection electrodes 9 and/or the potential $U_K$ of the focus head 8 to be lowered. The deflection electrodes 9 disposed as insulated electrodes briefly remain at full potential $U_C$. The deflection voltage $U_D$ may also be present at the deflection electrodes 9.

Since the high-voltage is not generated directly at the cathode 2, a delay may occur while the focus head 8 and the deflection electrodes 9 adapt to the same potential. During the interim, almost all of the voltage drops across the insulation elements 4 of the deflection electrodes 9. Further discharges may result shortly after the arcing and may lead to an accelerated destruction of the sensitive insulation elements 4 of the deflection electrodes 9. Due to the energy-rich discharge, discharge traces on the insulation elements 4 and material deposits on the insulation elements 4 may occur. The material deposits are detrimental to the vacuum in the vacuum housing 1 and, therefore, to operation of the x-ray tube.

In the x-ray tube shown in FIG. 1, a voltage arrester device with an insulation path may be provided in order to protect the cathode 3 and the focus head 8 against overvoltages over service lifetimes. The field strength of the insulation path is higher than the field strength at insulation element 4. When a voltage flashover occurs, a voltage is discharged via the voltage arrester device.

FIG. 2 shows an example of an x-ray tube that includes a voltage arrester device in the vacuum housing 1.

As shown in FIG. 2, the voltage arrester device includes at least one first protective electrode 10 and at least one second protective electrode 11. The first protective electrode 10 is at a predetermined distance from the second protective electrode 11. This distance defines the insulation path of the voltage arrester device. For simplicity, only two of the first protective electrode 10 and the second protective electrode 11 are shown.

The number and the form of the first protective electrode 10 and the second protective electrode 11 may be readily adapted to the respective constructive circumstances and to the respective application.

As shown in FIG. 2, the first protective electrodes 10 are provided on the focus head 8, and the second protective electrodes 11 are provided on the deflection electrodes 9. In this configuration, the insulation elements 4 are protected against overvoltages and damage resulting therefrom (e.g. material coming loose, degradation).

Figure 3:
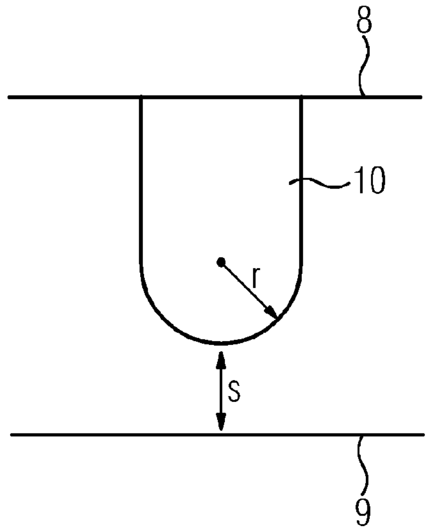
FIG. 3 shows a schematic illustration of an exemplary voltage arrester device in the area of the cathode.

As shown in FIG. 3, the voltage arrester device includes a first protective electrode 10 that is embodied as a finger electrode and is disposed on the focus head 8. The second protective electrode 11 is formed by a deflection electrode 9.

The head of the finger electrode 10 (e.g., the first protective electrode) has a radius r (e.g., a "head radius") and a distance s (also referred to as "arc width") to the deflection electrode 9. The selection of the radius r and the distance s (e.g., insulation path of the voltage arrester device) enables the field strength to be set for normal operation. The "sphere-plate" arrangement provides a weakly inhomogeneous electric field. Premature discharges may be reliably avoided in the weakly inhomogeneous electric field.

As shown in FIG. 3, a voltage arrester device in the form of a vacuum insulation path may be constructed by minor modifications to the geometry of the focus head 8. By designing the first protective electrode 10 as a finger electrode between the focus head 8 and the deflection electrode 9, the insulated functional parts appended to the cathode 2 or the anode 3 may be protected against transient shifts in potential.

Since molybdenum bars may be used as supply leads to the focus head 8, the supply leads may, for example, be attached at a defined distance from one another, so that the molybdenum bars may provide a spark gap. For this, a sufficient mechanical stability and resistance to degradation against electrical discharges is to be provided.

Figure 4:
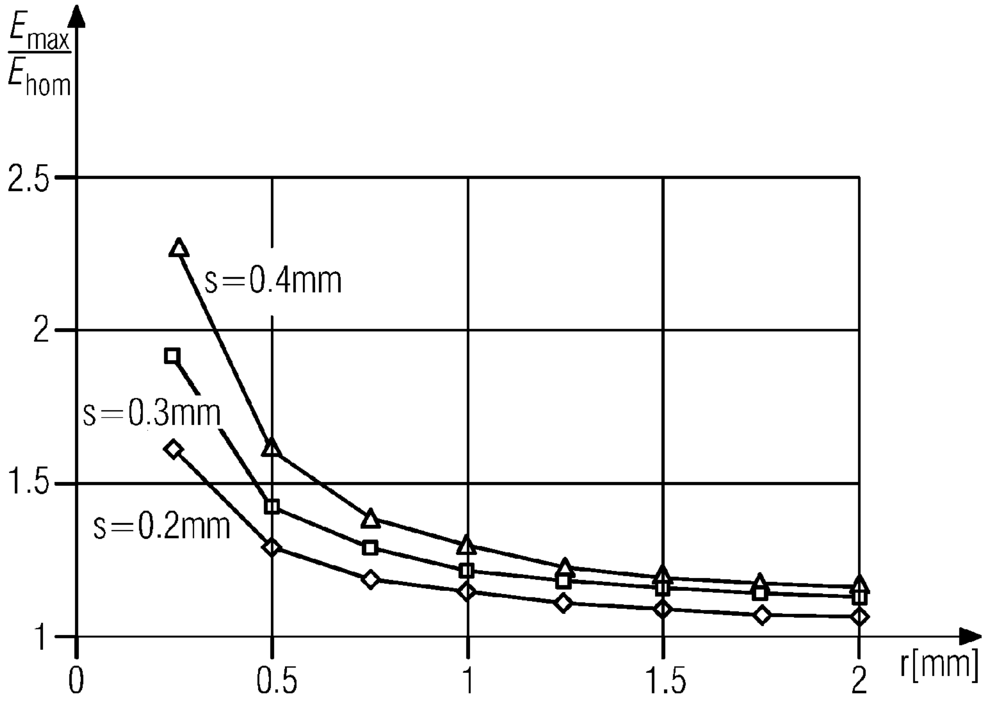
FIG. 4 shows a curve of field strength as a function of the distance between a deflection electrode and a protective electrode.

FIG. 4 shows a plot of field strength as a function of radius r of the first protective electrode 10 for three different distances s between the deflection electrode 9 and the first protective electrode 10.

The field strengths $E_{max}$ are plotted on the ordinate axis and standardized to the respective ideal homogeneous field strength $E_{hom}$ (e.g., dimensionless variables).

The head radius r of the first protective electrode 10 is plotted on the abscissa axis in units of millimeters.

The field strengths $E_{max}$ are plotted as standardized to the respective ideal homogeneous field strength $E_{hom}$ (e.g., dimensionless variable). The homogeneous field strength $E_{hom}$ is defined for the ideal plate capacitor by the respective plate distance s (e.g., "surge width"). The head radius r of the first protective electrode 10 determines the respective percentage field increase.

In some embodiments of the voltage arrester device, the electrical fields do not exhibit too great an inhomogeneity and are slightly inhomogeneous. A head radius r of the first protective electrode 10 that is too small would lead to undesired cold emissions or premature discharges in normal operation. A flashover only occurs with an overvoltage at the focus head 8 (e.g. flashover between anode 3 and cathode 2).

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. An x-ray tube comprising:
- a vacuum housing;
- an anode positioned within the vacuum housing;
- a cathode comprising a deflection electrode and a focus head positioned within the vacuum housing;
- an insulation element positioned adjacent to the focus head of the cathode such that the insulation element is positioned between the focus head and the deflection electrode of the cathode; and
- a voltage arrester device that comprises an insulation path, the voltage arrester device comprising at least one first protective electrode and at least one second protective electrode, wherein the at least one first protective electrode is disposed on the focus head of the cathode and the at least one second protective electrode is disposed on the deflection electrode of the cathode;
- wherein, upon application of a high voltage, the cathode is configured to emit electrons that are configured to strike the anode as an electron beam;
- wherein the insulation path of the voltage arrester device has a field strength that is higher than a field strength at the insulation element; and
- wherein the voltage arrester device is configured to discharge voltage when a voltage flashover occurs.

2. The x-ray tube of claim 1, wherein the at least one first protective electrode comprises a spherical contour.

3. The x-ray tube of claim 1, wherein the at least one second protective electrode comprises a spherical contour.

4. The x-ray tube of claim 1, wherein the at least one first protective electrode comprises a plate-shaped contour.

5. The x-ray tube of claim 1, wherein the at least one second protective electrode comprises a plate-shaped contour.

6. The x-ray tube of claim 1, wherein the voltage arrester device is provided between the cathode and the vacuum housing.

7. The x-ray tube of claim 1, wherein the voltage arrester device is provided between the anode and the vacuum housing.

8. The x-ray tube of claim 1, wherein the voltage arrester device is provided between the cathode and the anode.

9. The x-ray tube of claim 1, wherein the insulation path is a distance between the at least one first protective electrode and the at least on second protective electrode.

10. The x-ray tube of claim 1, wherein the insulation element is at least one glass or ceramic passthrough.

11. The x-ray tube of claim 1, wherein the focus head, the insulation element, and the deflection electrode are positioned within a first plane, wherein the anode is positioned within a second plane, and wherein the first plane and the second plane are parallel with each other.

* * * * *